(12) United States Patent
Danko

(10) Patent No.: US 8,430,166 B2
(45) Date of Patent: Apr. 30, 2013

(54) GEOTHERMAL ENERGY EXTRACTION SYSTEM AND METHOD

(75) Inventor: George L. Danko, Reno, NV (US)

(73) Assignee: Board of Regents of the Nevada System of Higher Education, Reno, NV (US)

(*) Notice: Subject to any disclaimer, the term of this patent is extended or adjusted under 35 U.S.C. 154(b) by 170 days.

(21) Appl. No.: 12/780,538

(22) Filed: May 14, 2010

(65) Prior Publication Data

US 2010/0288466 A1 Nov. 18, 2010

Related U.S. Application Data

(60) Provisional application No. 61/178,237, filed on May 14, 2009.

(51) Int. Cl.
*E21B 36/00* (2006.01)

(52) U.S. Cl.
USPC ............ 166/302; 166/272.1; 166/305.1; 166/306; 166/369; 166/57

(58) Field of Classification Search .............. 166/268, 166/401, 272.1, 272.2, 272.7, 271, 302, 305.1, 166/306, 369, 57
See application file for complete search history.

(56) References Cited

U.S. PATENT DOCUMENTS

| | | | | | |
|---|---|---|---|---|---|
| 3,470,943 | A | * | 10/1969 | Van Huisen | 165/45 |
| 3,580,330 | A | * | 5/1971 | Maugis | 165/45 |
| 3,863,709 | A | * | 2/1975 | Fitch | 165/45 |
| 2003/0010652 | A1 | * | 1/2003 | Hunt | 205/742 |
| 2007/0223999 | A1 | * | 9/2007 | Curlett | 405/55 |
| 2010/0000736 | A1 | * | 1/2010 | Bour et al. | 166/281 |
| 2010/0272515 | A1 | * | 10/2010 | Curlett | 405/55 |

* cited by examiner

*Primary Examiner* — Shane Bomar
*Assistant Examiner* — Elizabeth Gitlin
(74) *Attorney, Agent, or Firm* — Ryan A. Heck; UNR-DRI Technology Transfer Office

(57) ABSTRACT

A system and process for extracting geothermal energy from a geologic formation. Coolant fluid is introduced into a first fracture system. The first fracture system is at a first height in the formation. The coolant fluid is collected from a second fracture system. The second fracture system is at a second height in the fracture system. The second height is lower than the first height. Coolant fluid introduced into the first fracture system percolates through the geologic formation from the first fracture system to the second fracture system, collecting heat from the geologic formation.

20 Claims, 7 Drawing Sheets

GEOTHERMAL ENERGY EXTRACTION SYSTEM AND METHOD

CROSS REFERENCE TO RELATED APPLICATION

This application claims the benefit of, and incorporates by reference, U.S. Provisional Patent Application No. 61/178,237, filed May 14, 2009.

FIELD

The present disclosure relates, generally, to a method and a system for increasing the thermodynamic efficiency of extracting geothermal energy.

SUMMARY

One embodiment of the present disclosure provides a geothermal energy extraction method. According to the method, in a geologic formation, coolant fluid is introduced into a first fracture system at a first height. Water is collected from a second fracture system a second height, which is lower than the first height. The first and second fracture systems are in fluid communication. Coolant fluid introduced into the first fracture system percolates through a geologic formation from the first fracture system to the second fracture system, collecting heat from the geologic formation. In some examples, the second fracture system has a higher temperature than the first fracture system.

In some implementations, the method includes forming the first or second fracture system. The method can also include a third fracture system intermediate, and in fluid communication with, the first and second fracture systems. According to a particular example, the first, second, or third fracture system is formed by creating a borehole, creating a pilot hole ahead of the borehole, and fracturing the geologic formation proximate the pilot hole.

In a further implementation, coolant fluid is removed from the second fracture system. In one example, the coolant fluid is lifted from the geologic formation. For example, the coolant fluid can be removed to the surface for energy extraction. Energy can be extracted at the surface using a heat exchanger. In another example, energy is extracted in situ and the cooled coolant fluid is circulated within the geologic formation, such as entering through the first fracture system. When energy is extracted in situ, a heat exchanger may be located in a production borehole.

Energy may be extracted under steady or variable coolant fluid flow. Pressure control means, such as a pump, can be used to lower the pressure of the second fracture system below that of the surrounding area. This can discourage loss of coolant fluid to the surrounding geologic area by reducing or eliminating the driving pressure difference.

Coolant fluid can be removed from second fracture system using any suitable techniques. One technique is pumping. Another suitable technique is air lifting. When pumping is used, in one example compressed air is injected to the high pressure side of the pump, contributing to air lifting. In another example when pumping is used, compressed air is introduced into the body of the pump. The compressed air expands in the pump, contributing to pump cooling. In another example, pumping is used to lower the pressure of the second fracture system, which can increase the flow of coolant fluid into the second fracture system from the first fracture system. In yet another example, a pump is located at a higher level than the bottom of the second fracture system. This can aid in opening fractures within the first or second fracture systems.

In another implementation, coolant fluid is provided to the first fracture system. In one example, the coolant fluid is supplied by an injection borehole. In another example, the coolant fluid is supplied from a natural geologic feature, such as a fracture or fault to/in a hydrothermal reservoir.

According to another embodiment, which may be combined with the above embodiment, fluid within first and/or second fracture systems is periodically evaporated in order to increase the active surface area of the first or second fracture systems. In one example, evaporation is achieved by lowering the pressure of the first or second fracture systems below the saturated or dissolution pressure limit of the coolant fluid. When the pressure is suitably lowered, a phase change is induced and liquid phase coolant is purged from fractures by the gas phase in one cycle. The pressure can then be raised, or allowed to rise, above the saturated or dissolution limit to deliver liquid phase coolant to the fractures in another cycle. Liquid phase and gas phase cycles are alternated, in one embodiment, in order to increase heat extraction, such as by contacting a greater surface area of the fracture system. Between cycles, a vigorous fluid flow field and latent heat exchange, in addition to sensible heat exchange, is created between the coolant fluid and the fracture system (rock). The implementation can be used to promote delivery of coolant fluid to stagnant, hard to reach fracture areas.

In another embodiment, the present disclosure provides a geothermal energy extraction system at least partially located in a geologic formation. The system includes a first fracture system at a first height and a second fracture system at a second height. The second height is lower than the first height. The first and second fracture systems are in fluid communication. The system includes a fluid transport means, such as a pump or gaseous fluid source, such as an, air source, for gaseous lifting, such as air lifting, of coolant fluid. An energy recovery unit, such as a heat exchanger, is also included in the system. A coolant fluid source is in fluid communication with the first fracture system.

In operation, coolant fluid is provided to the first fracture system from the coolant fluid source. The coolant fluid travels through the first and second fracture systems. Coolant fluid is transported from the second fracture system to the energy recovery unit using the fluid transport means.

In some implementations, the system includes a gaseous fluid source, such as a compressed air source. In one example, the gaseous fluid source is coupled to the high pressure side of a pump, wherein it can be used to aid gaseous lifting of the coolant fluid from the second fracture system. In another example, the gaseous fluid source is coupled to the body of a pump, where it can be used to help cool the pump.

In another implementation, the system includes a third fracture system intermediate and in fluid communication with the first and second fracture systems.

In a particular example, the coolant fluid source includes an injection borehole. In another example, the coolant fluid source includes a natural geologic feature, such as a fracture or fault in/to a hydrothermal reservoir.

In a further example, the heat exchanger is located in a production well. In a yet further example, the pump is located higher that the bottom of the second fracture system, where is can aid in opening fractures in the first or second fracture systems.

There are additional features and advantages of the subject matter described herein. They will become apparent as this specification proceeds.

In this regard, it is to be understood that this is a summary of varying aspects of the subject matter described herein. The various features described in this section and below for various embodiments may be used in combination or separately. Any particular embodiment need not provide all features noted above, nor solve all problems or address all issues in the prior art noted above.

DETAILED DESCRIPTION

Figure 1:
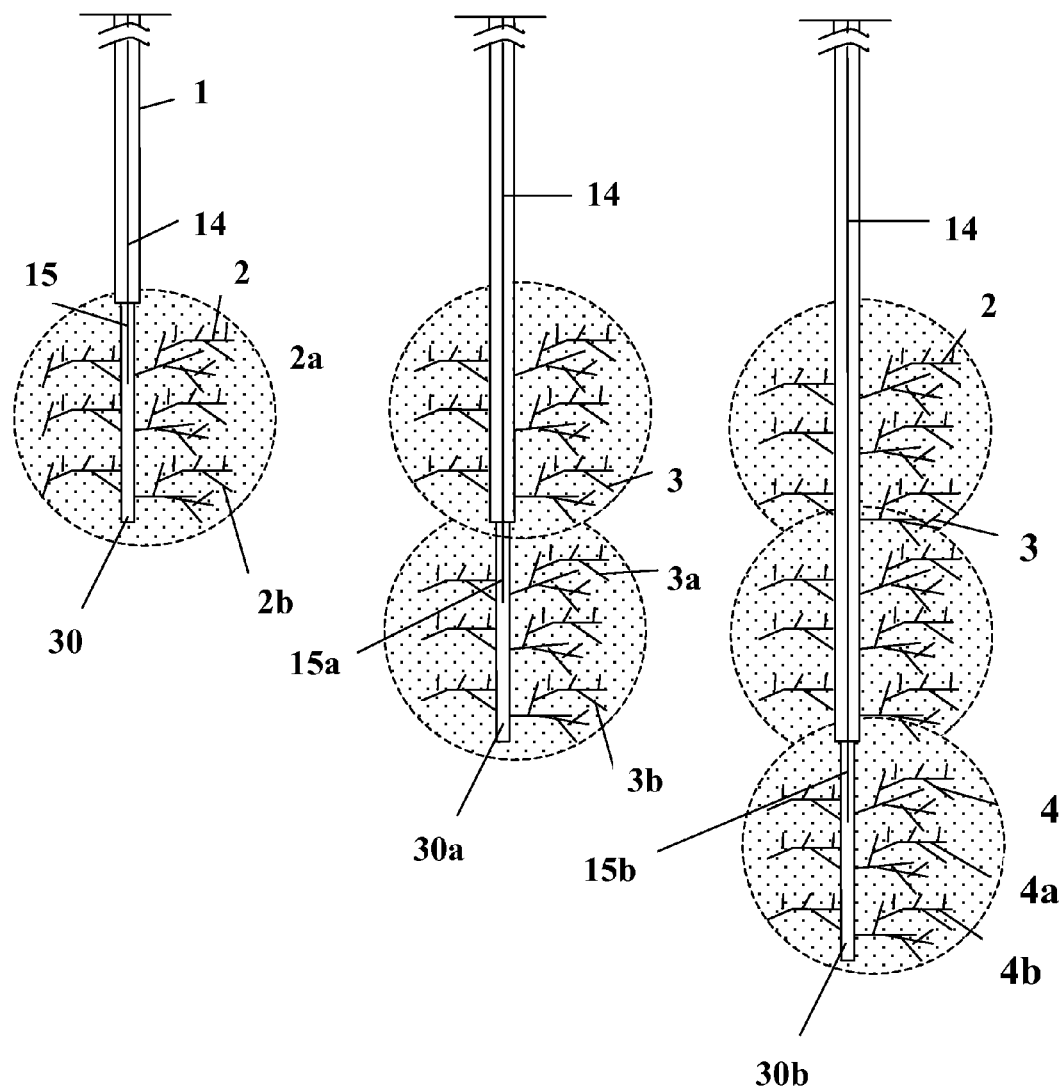
FIG. 1 is a schematic diagram of a method of producing a multilayered fracture system according to an embodiment of the present disclosure, and of the fracture system formed thereby.

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end points (unless specifically excluded) and any and all intermediate ranges between the endpoints.

Coolant fluid, as used in the present disclosure, may be a liquid, has, or a mixture of liquid and gas, or a liquid with disclosed gas. In a specific example, the liquid is water. In further examples, the gas is air, carbon dioxide, or the vapor or steam from evaporated liquid. In a more specific example, the liquid is water and the gas is air, carbon dioxide, or water vapor or steam.

Phase changes due to pressure changes may be in the form of evaporation and/or condensation or solution and/or dissolution.

Latent heat refers to energy change due to phase change in general, including latent heat for evaporation/condensation and latent heat for solution/dissolution.

Although methods and materials similar or equivalent to those described herein can be used in the practice or testing of the present disclosure, suitable methods and materials are described herein. The disclosed materials, methods, and examples are illustrative only and not intended to be limiting.

A new geothermal energy extraction system is described with an improved subsurface heat exchanging process. The new system increases the output temperature of the cooling fluid used for energy recovery, and this way increases the efficiency of the power system with an increased thermodynamic efficiency for a given geologic setting. The solutions described in the disclosure pertain, in particular examples, to a conventional hydrothermal system with low hydrologic permeability and low natural flow rates or a system involving the geothermal energy of dry hot rock which does not have a substantial natural fluid flow system.

Natural geothermal energy systems with low permeability and water flow rates in large and hot rock areas have similar problems to those in deep geological settings with dry hot rock with regard to energy recovery. They both need convective fluid flows to be established in order to exploit significant amounts of thermal energy. They both need an artificial fracture system in the rock to be established for the facilitation of convective fluid flows.

Enhanced geothermal systems often rely on the principle of hydro-fracturing of dry rock mass deep underground. The fracture system at any location around the borehole typically depends upon the in situ stress field of the rock mass and the hydraulic pressure applied to the fracturing process. Since hydrostatic pressure greatly varies with elevation, more control can be exercised when the fracturing along the borehole is created sequentially, one fracture network system at one elevation at a time.

In the following description, it is assumed that a sufficiently long section of a deep borehole stretching across a hot geologic area can be fractured at various depths. It is further assumed that the fractured zone around the borehole can extend in radial direction into the rock mass several tens or hundreds of meter. A particularly advantageous sequence of fracture network creation is described along a deep borehole drilled in dry hot rock or hot rock in a hydrothermal field with low permeability, such a permeability insufficient for creating convective flows.

The process of generating multiple levels of fracture network around a borehole is described with the use of FIG. 1. When the depth of borehole 1 reaches the desired depth at which useful temperature is found for geothermal energy extraction, the drilling is stopped and a smaller diameter pilot hole 10 is drilled ahead of the larger-diameter borehole 1 to some depth, e.g., 300 m, to create fractures starting at that depth. The pilot hole 10 is used to create a fracture network around it. In some examples, the fracture network is substantially spherical or ellipsoidal in shape.

For fracturing, the pilot hole section 10 is sealed at its collar with pressure seal 15. Hydro-pressure is generated around it by pumping a sufficient flow rate of water into it through the fracturing pressure pipe 14. A fracture network system 2 is created to a desired depth or degree, such as having a radial diameter of about 300 m. Orientations of the fractures typically depend on the in situ stress field and the planes of weakness of the rock formation. The development of the fractures in a radial direction typically results from the fracturing process, and the network occurs with a random structure in spite of dominant fracture planes. However, in some embodiments, the fracture system is developed in a more controlled manner, such as by adjusting the applied hydraulic pressure or the pumping flow rate, which can influence fracturing velocity. In yet further examples, the fracture apertures are treated to help them remain open, such as by pumping in solid particles, e.g., screened sand or gravel, called propants.

Multiple branches of the fracture network 2a and 2b may be created along the first pilot hole section 30, as shown in FIG. 1. The fracture network system is, in some implementations, assessed and completed after sufficient fracture volume and apertures are established. Assessment may be made by suitable methods, including measuring the volume of the fracturing fluid pumped into the fracture network; pumping and extracting tracer elements and observing the variation of concentration with time; micro-seismic wave reflection measurements, and combinations thereof.

Once the fracture system is created at one depth area, the fracturing pressure pipe 14 is extracted, and the pilot hole 30 is re-drilled, removing pressure seal 15 at that depth, and extending borehole 1 to a greater depth below the area of fracture network 2b. At this second depth, shown in FIG. 1, the fracturing process is repeated by means of drilling a pilot hole 30a; insertion of fracturing pressure pipe 14; and creating a pressure seal 15a; and creating a new fracture network system 3, with possible fracture network branches 3a and 3b. The assessment of the fracture network system 3, 3a, and 3b is conducted again and re-fracturing is continued until satisfaction. Fracturing is completed when hydrologic flow connection between branches of fracture network 2, 2a, and 2b and branches of fracture network 3, 3a, and 3b has been established and positively confirmed by assessment means.

Once the fracture system is completed at the second depth area, the fracturing pressure pipe 14 is extracted, and the pilot hole 30a is re-drilled, removing pressure seal 15a at that depth, and extending borehole 1 to a greater depth below the area of fracture network 3b. At this third depth, shown in FIG. 1, the fracturing process is repeated by means of drilling a pilot hole 30b; insertion of fracturing pressure pipe 14; and creating a pressure seal 15b; and creating a new fracture network system 4, with possible fracture network branches 4a and 4b. The assessment of the fracture network system 4, 4a and 4b is conducted again and re-fracturing is continued until satisfaction. Fracturing is completed when hydrologic flow connection between branches of fracture network 3, 3a, and 3b and branches of fracture network 4, 4a, and 4b has been established and positively confirmed by assessment means.

Once the fracture system is completed at the third depth area, the process may continue to even greater depths. For example, it may be advantageous to fracture the rock mass around a borehole from 4,000 m depth down to 6,000 m depth, or even deeper. Shallower depths can be sufficient in a natural geothermal area. The fracture system will be a high-permeability fracture network around borehole 1, forming fractured zone 6, capable of carrying convective cooling fluid for geothermal energy extraction from the top of fractured zone 6 to its bottom. The advantage of creating a multiple-level fracture network system through a series of pilot holes is that the process does not interfere with the completion of borehole 1 and the placement of its liner in long, constant-diameter sections.

Figure 2:
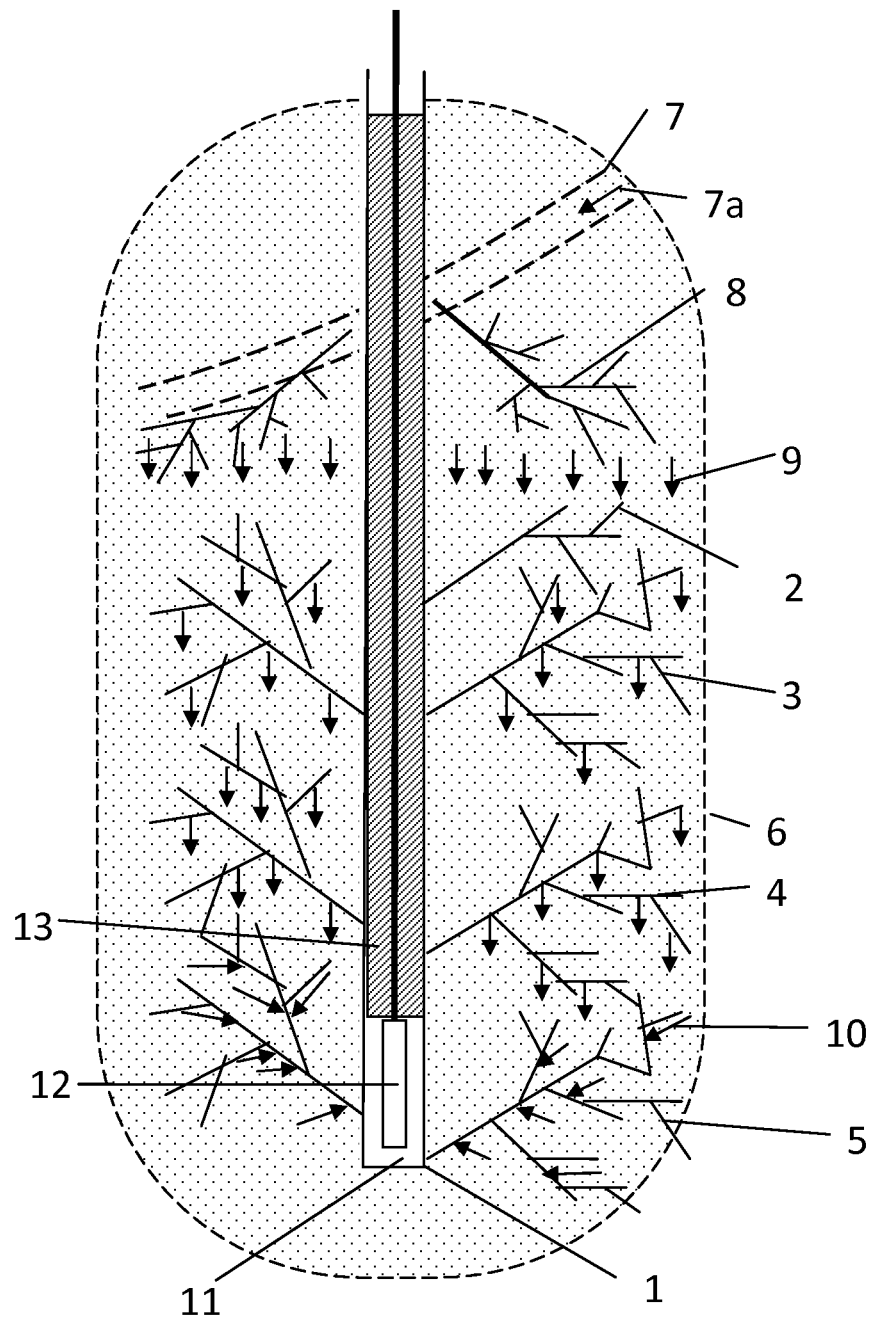
FIG. 2 is a schematic diagram of an energy extraction system and process according to an embodiment of the present disclosure having an injection borehole.

The completion of the geothermal energy extraction system in FIG. 2 involves several more steps. A cooling fluid delivery fracture network system 8 is created within the fractured zone 6. This can be done from borehole 1, effectively designating the first fractured system 2 as delivery fracture network 8. The fracture network system 8 is also connected to a second borehole, borehole 7, for injecting geothermal cooling fluid 7a if a hot dry rock area is used. Optionally, delivery fracture network 8 may be created from borehole 7 in a similar manner described regarding fracture creation around borehole 1.

Figure 3:
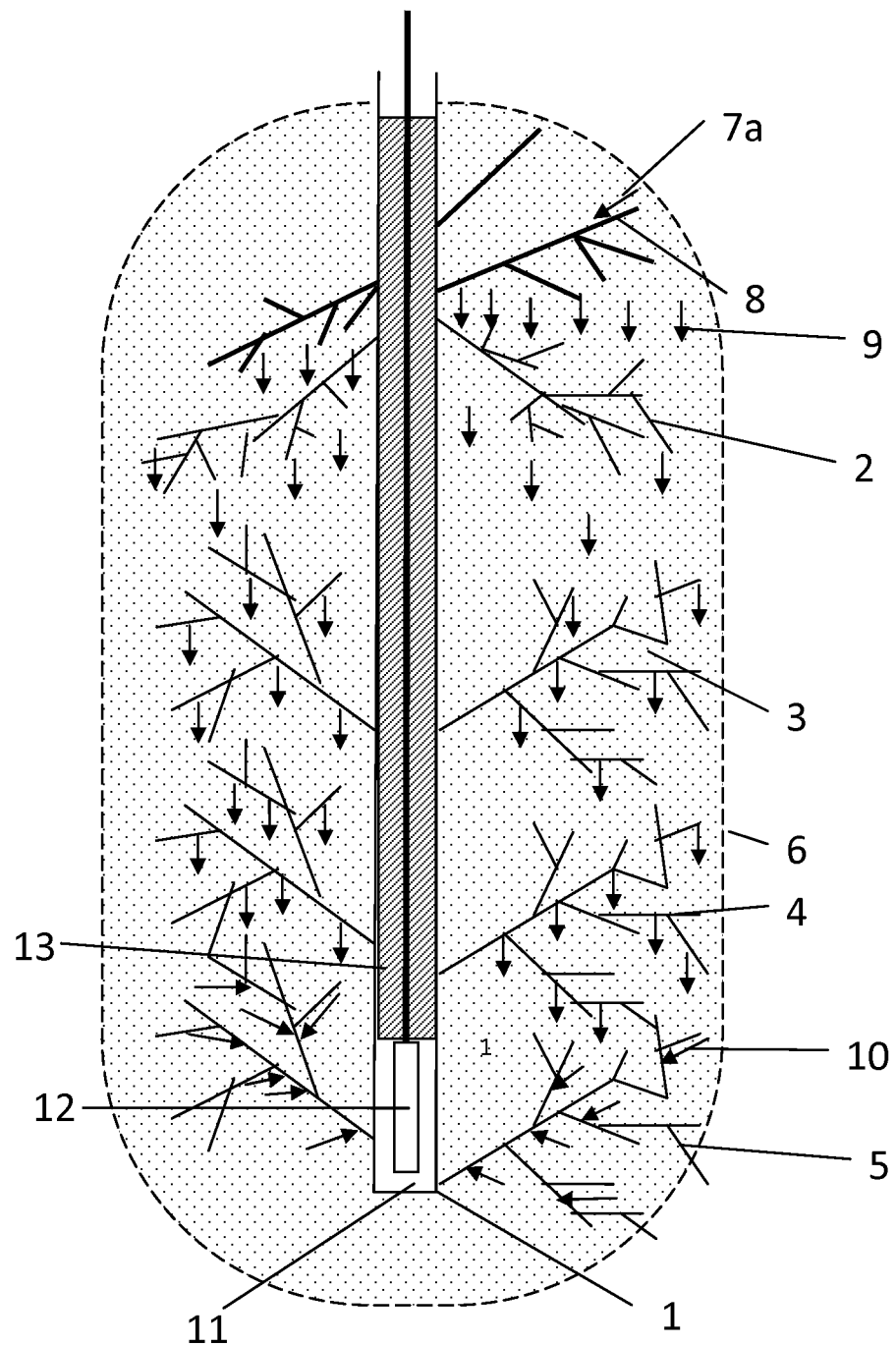
FIG. 3 is a schematic diagram of an energy extraction system and process according to an embodiment of the present disclosure not having a injection borehole.

As shown in FIG. 3, injection borehole 7 is omitted in some configurations, such as if the hot rock area is connected to a natural hydrothermal system. For example, injection borehole 7 may be replaced by a major natural fracture or fault in a geologic system of a hydrothermal reservoir. In this case, injection fluid 7a is percolation fluid flow from the natural system.

Referring primarily to FIG. 2, although a similar system/process takes place in FIG. 3 (with the exception of the injection borehole 7), collection fracture network 5 is created at the bottom of fractured rock zone 6, carrying hot fluid flow 10 to borehole 1 which is used as a production borehole to lift hot fluid for power generation. This can be done from borehole 1, effectively designating the last fracture network system (such as system 4 in the rightmost panel of FIG. 1) as collection fracture network 5.

Multiple levels of fracture network systems around borehole 1 can be created by other ways. For example, borehole 1 can first be drilled, observed for assessing geology, lithography, fracture and/or faults, and completed with casing. Fractured zone 6 can then be created as a next step around borehole 1 over the desired length by sequentially, level-by-level (1) jet-drilling through the casing; (2) sealing of a section around the jet-drilled holes; and (3) hydro-fracturing at each level. According to an embodiment of the present disclosure, the access holes in the casing drilled for fracturing are sealed off, except for those connected to injection fractures 8 and collection fractures 5. Sealing may be accomplished by inserting another liner or casing into borehole 1 or by other means.

FIG. 2 illustrates the connected fracture network system in a simplified fashion, depicting the delivery fracture network 7, transmission fracture network branches 2, 3 and 4 as examples for a possible solution with a large-enough vertical extent, and the collection fracture network 5 around borehole 1 all within fractured rock zone 6. FIG. 2 also shows pump 12 with its delivery pipe to carry upward the hot fluid.

At least one delivery fracture system 8 for the introduction of cooling fluid 7a at a higher elevation and one collection fracture system 5 at a lower elevation are used according to an embodiment of the present disclosure. The two fracture systems are connected as an integral flow system in fractured zone 6. An arbitrary number of intermittent, transmission fracture network systems may be inserted between the delivery and the collection fracture systems to increase the volume and surface area along the working length of borehole 1 for heat exchange.

The geothermal energy extraction system according to an embodiment of the present disclosure operates on a reversed flow principle relative to known solutions. The flow direction of the convective cooling fluid is from top to bottom, allowing for increasing the temperature of the cooling fluid along its flow path as it reaches hotter rock areas at increasing depths. This way, the heat extracted from the rock mass will be delivered at the highest possible temperature, allowing the thermodynamic efficiency of the energy conversion to be increased from thermal energy to mechanical energy in the turbine system. Heat is typically more valuable at higher temperature than at lower temperature, increasing the thermodynamic efficiency. If the flow direction of the hydrothermal fluid is in the direction of the geothermal gradient, the exit temperature is increased, and the entropy is decreased, relative to other flow directions. Therefore, the geothermal extraction principle according to an embodiment of the present disclosure can be more efficient that prior techniques. This increased efficiency is due, in some implementations, by the enhanced convective heat exchanging system and the extraction of the counter-current percolation flow relative to natural, buoyancy-driven circulation directions.

In typical existing systems, the geothermal fluid flow direction is upward, reaching rock areas at lower temperature as the cooling fluid collects thermal energy, impeding the overall thermal efficiency, and increasing entropy. A system according to an embodiment of the present disclosure allows for converting a larger portion of the gross thermal energy lifted from the ground into usable mechanical or electrical energy. Buoyancy-driven, small-scale flow eddies moving upward may develop within certain areas in fractured zone 6. Natural, thermal syphon-type circulation loops involving vertical upward flows locally may also be formed in certain areas. These circulation loops will not impede, but rather further enhance local convective heat transport within the overall, dominantly downward flow direction for convective thermal energy transport.

Downward coolant flow encounters hotter rock and removes heat from it, while increasing its own temperature and energy content. At the same time, the fracture aperture opens up due to thermal contraction of the rock under cooling. In comparison, in case of upward coolant flow direction in the current practices, the hot fluid may encounter colder rock, effectively losing its cooling ability, and making the heat exchange surface inefficient. The fracture aperture may tend to close under heating by the hotter fluid, increasing the pressure loss and the required pumping pressure, and/or decreasing the flow velocity.

The flow system is explained with the use of FIG. 2. Injection fluid 7a enters the fractured zone 6 of the hot rock area as induced percolation 9, originating from injection borehole 7 through injection fracture network 8, in fractured, enhanced dry hot rock application; or from natural percolation through fractures and faults in fractured, enhanced hydrothermal reservoir application. The induced percolation continues throughout the vertical extent of the fractured zone 6 until it reaches the collection fracture network 5 and flows back as hot fluid flow 10 into the low pressure chamber 11 of the bottom of production borehole 1. Pressure lowering is accomplished by a suitable fluid extraction means for removing coolant fluid from the geologic formation, such as employing a pump 12 or applying gaseous lifting, such as air lifting, which elevates fluid from a well by mixing well fluid with compressed air bubbles. FIG. 2 shows pump 12 with the suction side connected to the low pressure chamber 11 and a delivery pipe which carries the hot reservoir fluid to the surface. Heat and pressure insulation 13 is used to fill the annulus between the delivery pipe and borehole 1.

Figure 4:
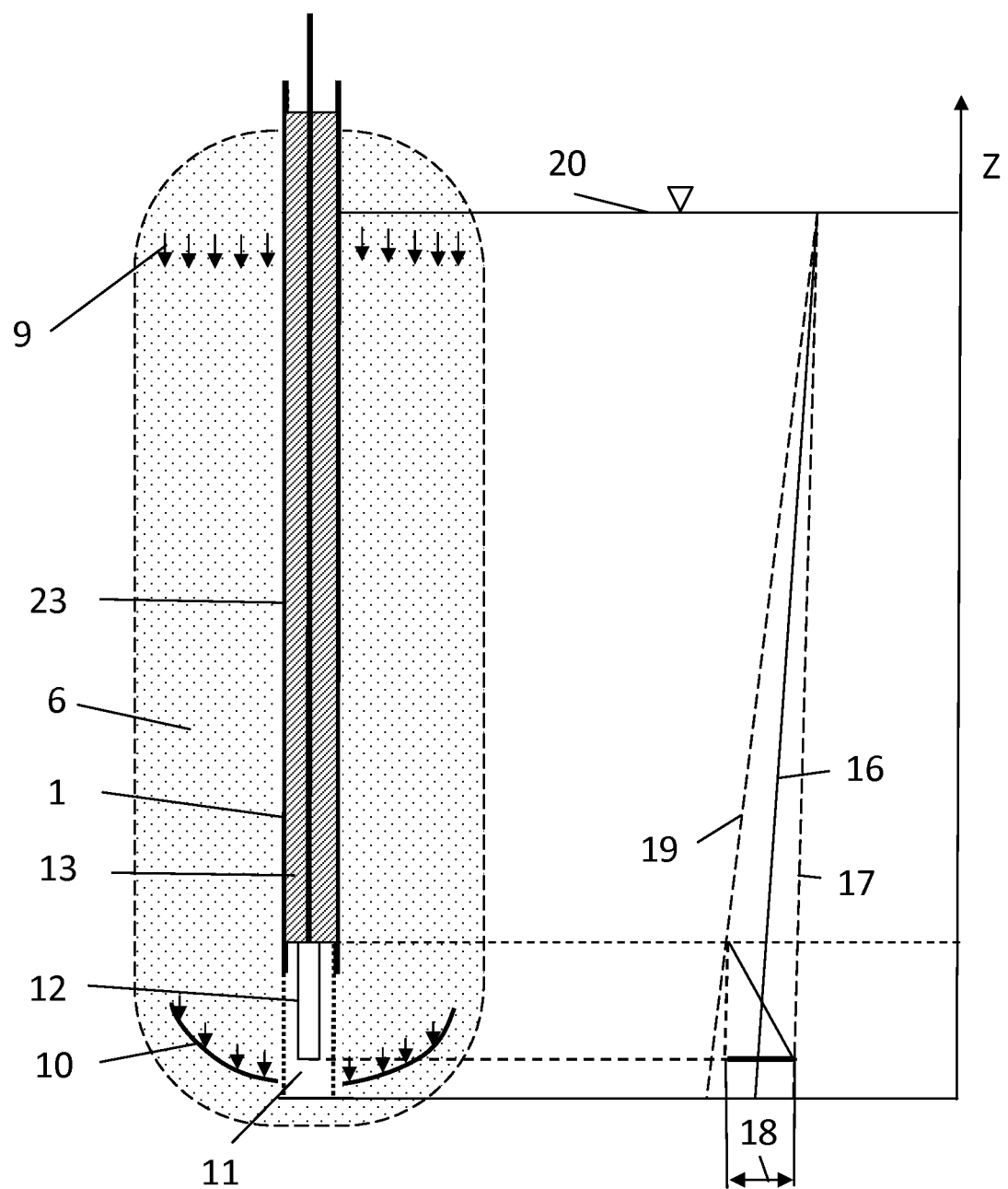
FIG. 4 is a schematic diagram of an energy extraction system and process according to an embodiment of the present disclosure showing pressure fields within the system.

FIG. 4 provides another embodiment of a flow system for an enhanced hydrothermal reservoir with a major fracture or fault. Injection or natural groundwater fluid 7a enters the fractured zone 6 of the hot rock area as induced percolation 9, originating from a fracture or fault and replacing borehole 7 in FIG. 2, through a fracture network 8 which, in one example, is created from borehole 1. The induced percolation continues throughout the vertical extent of the fractured zone 6 until it reaches the collection fracture network 5 and flows back as hot fluid flow 10 into the low pressure chamber 11 of the bottom of production borehole 1. Pressure lowering is accomplished by employing a pump 12 or applying air lifting, elevating fluid from a well by mixing well fluid with compressed air bubbles. FIG. 3 shows pump 12, with the suction side connected to the low pressure chamber 11 and a delivery pipe which carries the hot reservoir fluid to the surface. Heat and pressure insulation 13 is used to fill the annulus between the delivery pipe and borehole 1.

FIG. 4 shows the main elements of the geothermal energy extraction system as well as the outside hydrostatic pressure field 16 within the outside of the fractured zone and the inside pressure field 17 within the inside of the fractured zone. As shown, inside pressure field 17 inside the fractured zone is lowered relative to the in situ pressure due to the friction loss caused by the downward flow field, placing and keeping the rock mass in fractured zone 6 under lower pressure, i.e., depression, relative to the surrounding rock formation. This advantageous pressure field can be maintained due to the placement of the pump at the lowest elevation, provided that induced percolation 9 does not require increased pressure relative to the in situ hydrostatic pressure. This case is shown in FIG. 4 with matching pressure lines 16 and 17 at the injection elevation 20 at the top of fractured zone 6. It must be noted that pump delivery pressure line 19 may be increased arbitrarily to meet the necessary pressure demand to lift the hot fluid to the surface, i.e., pressure 19 does not have to intersect pressure lines 16 and 17 at elevation 20. The pressure field according to FIG. 4 can eliminate or reduce the potential loss of hot fluids. Pump 12 increases the pressure within its length by a pressure difference 18 until it reaches delivery pressure in the delivery pipeline creating an upward flow.

The fractured zone can be made sufficiently large in volume (to access stored heat) as well as large in outside surface area (to access convective-conductive heat from the hot surrounding rock mass), and therefore, can be designed to extract large amounts of geothermal energy for sufficiently long time periods without significant depletion.

In some configurations, pump 12 operates at relatively high temperatures, which can exceed 300° C. In some cases, according to an embodiment of the present invention, pump 12 is operated by applying compressed air injection to the high pressure side of the pump, contributing to air lifting. In another example, compressed air is delivered to the body of the pump at a higher pressure than needed for air lifting injection. The compressed air is expanded to the injection delivery pressure within the casing of the motor. This way, expansion power, effectively a cooling power, may be created, which can advantageously decrease the operating temperature of the pump. Alternatively, in another embodiment of the present disclosure, the pump is omitted and another technique, such as air lifting, is used to move upward the hot reservoir production fluid.

Figure 5:
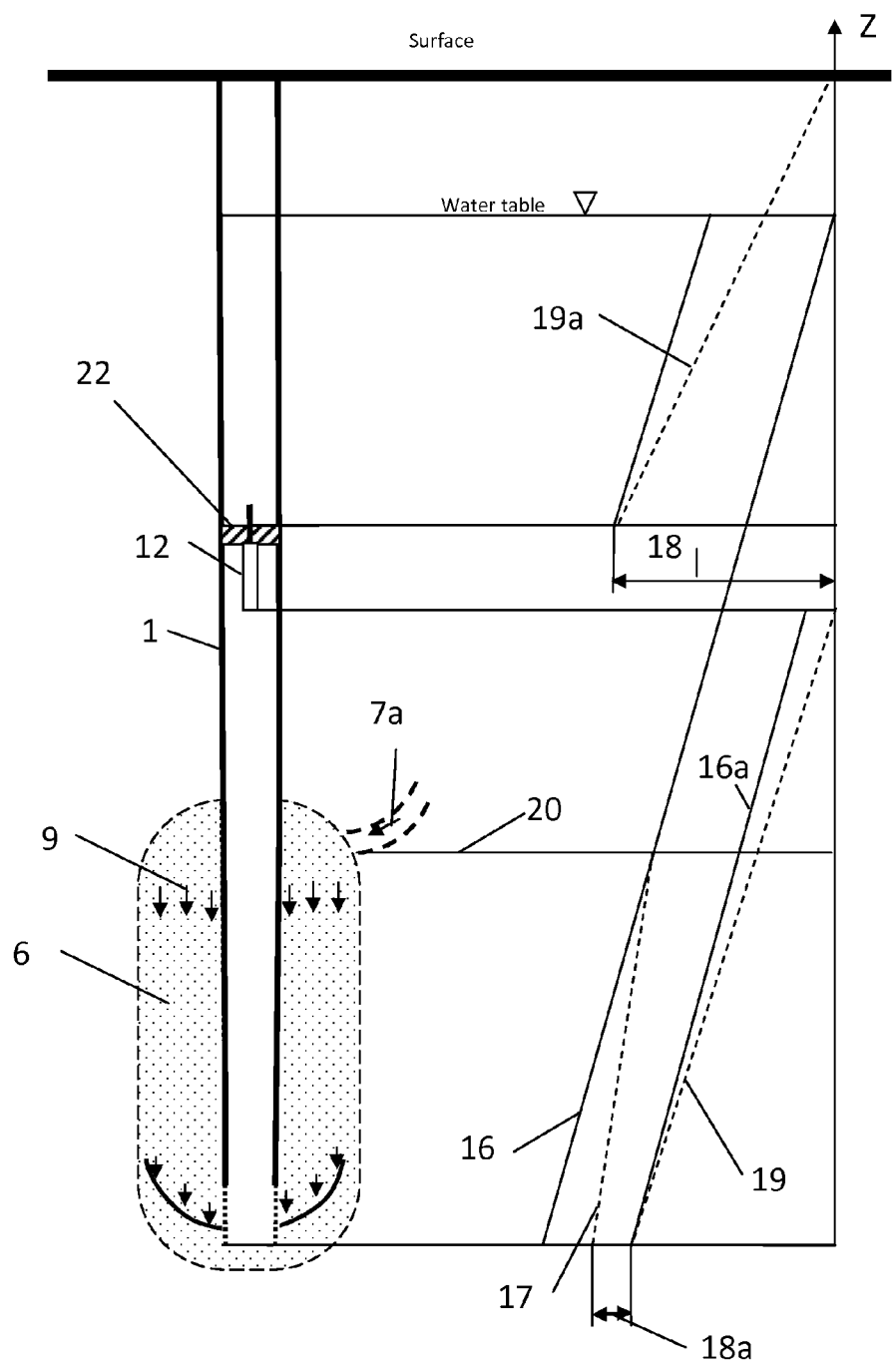
FIG. 5 is a schematic diagram of an energy extraction system and process according to an embodiment of the present disclosure where the system/process use increased injection pressure showing pressure fields within the system.

The elevation of pump 12 may be increased if an increased injection pressure at elevation 20 is required for maintaining fracture apertures in an open state; however, opening and stabilizing fracture apertures by propants may also be carried out, in addition to or in place of pressure opening. Such a case is shown in FIG. 5 as an example, delivering an injection pressure from a high watertable head along hydrostatic pressure 16 to the fractured zone at elevation 20. Note that the hydrostatic head may be above the surface, not shown. Inside pressure field 17 under percolation flow 9 starts from hydrostatic pressure 16 at elevation 20 in the example. Suction pressure difference 18a is created by pump 12 at which the absolute suction pressure at the intake is lowered to the physical minimum, shown as near zero in the example for simplicity. During pumping, this pressure must typically be kept higher than the saturated water pressure at that temperature, which can be quite high itself. The intake pressure at pump 12 is decreased by the pressure loss in borehole 1 due to friction, shown as a gradient difference between line 19 and line 16, as well as parallel line to it 16a, also depicted for clarity. Pump 12 delivers hot fluid to the surface along pressure line 19a, which assumes zero pressure at surface elevation. In some implementations, the hot fluid enters a heat exchanger to remove its thermal energy and convert it to mechanical and electrical energy. In a closed control volume in which the coolant fluid may be considered conserved, the cooled coolant fluid is re-injected into the circulation system. Such a case may be interpreted by connecting the end of pressure line 19a at the surface vertically to the beginning of pressure line 19 at the watertable elevation, assuming that the pressure loss of fluid handling at the power plant as well as the pressure loss of the discharge of the coolant fluid to the watertable is compensated by the elevation difference. A total pressure difference 18 typically must be provided by pump 12 to move hot fluid from the bottom of borehole 1 to the surface, a significant component in the pumping energy requirement for energy production.

Figure 6:
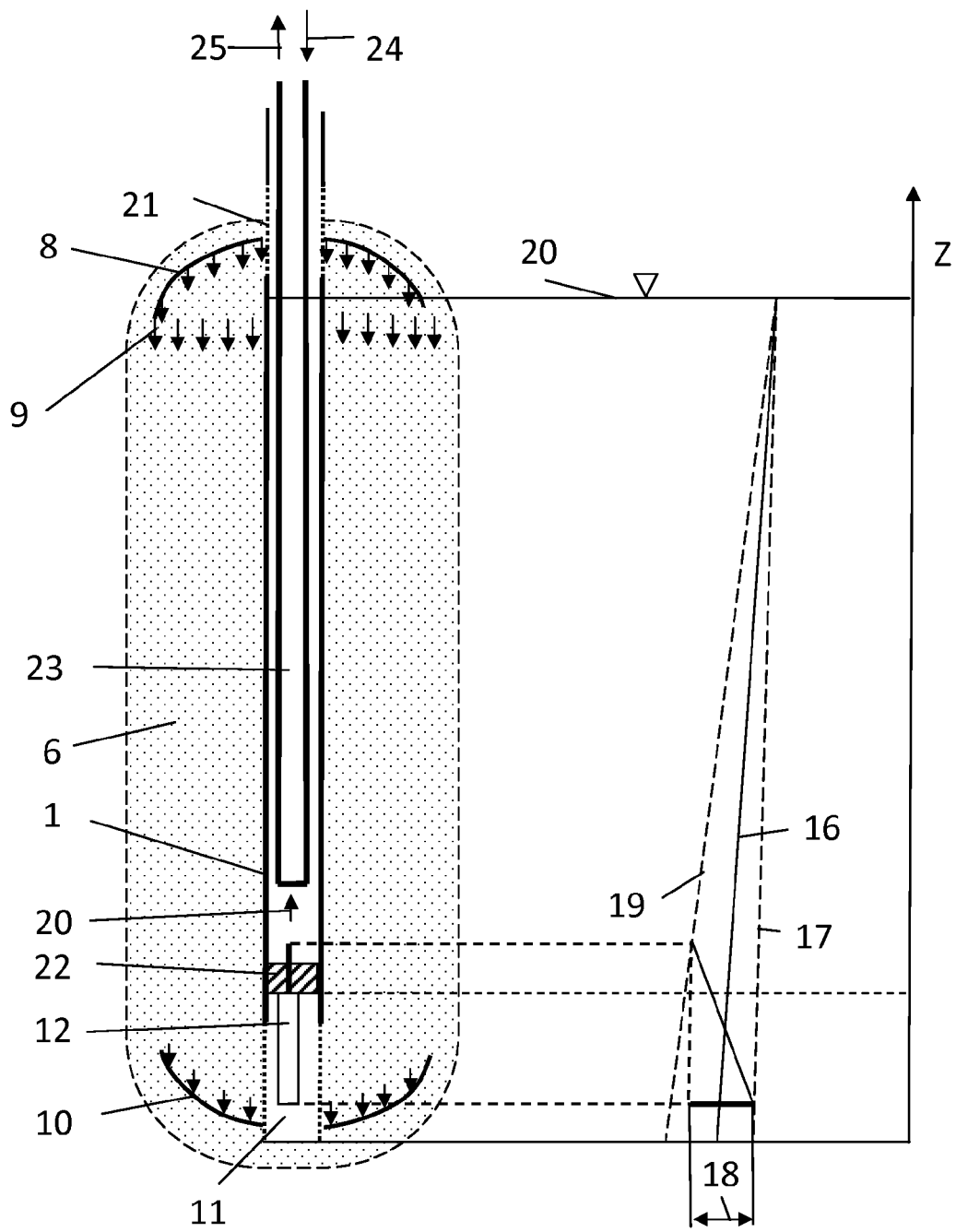
FIG. 6 is a schematic diagram of an energy extraction system and process according to an embodiment of the present disclosure where the system/process lacks an injection borehole showing pressure fields within the system.

An advantageous variation of the geothermal energy extraction system described in the foregoing is discussed with the use of FIG. 6. In this solution variation, injection borehole 7 is eliminated, and pump 12 lifts hot fluid from the collection fracture network system 10 to injection fracture network 8 directly. Pump 12 effectively establishes a thermal fluid circulation within the fractured rock zone 6, engineered to be counter-current direction to the direction of natural re-circulation under buoyancy driving forces. The outside hydrostatic pressure field 16 within the outside of the fractured zone and the inside pressure field 17 within the inside of the fractured zone are both shown to understand the flow system.

Pump 12 increases the pressure within borehole 1 to delivery pressure 19, creating an upward flow 20 in borehole 1 which is cased to prevent radial fluid flow to or from fractured zone 6, except for the upper section of fractured zone 6 around the fluid delivery fracture network 8. Along this discharge section 21, the casing of borehole 1 is screened, or punched, e.g., by jet drilling. Pressure seal 22 is used to prevent backflow to the low pressure chamber 11.

As shown, the pressure increase 18 across the pump is engineered to overcome the flow friction and momentum losses as well as the natural buoyancy pressure differences within the recirculation system. A standing water level 20 in borehole 1 is stabilized just above the screened discharge section 21 in order to maintain cooling fluid delivery to injection fracture network 8 and percolation flux 9. The energy recovery is accomplished by evaporative heat exchanger 23, basically a U-tube arrangement with a downward coolant fluid flow 24 in one leg and upward steam flow 25 in the other leg. This coolant fluid recirculation loop assumes at least in some examples, that the fractures are kept open without pressurizing them above the hydrostatic pressure at any location, e.g., injecting propants during hydrofracturing.

Another implementation of this variation applies compressed air injection for cooling and relieving pump 12 from excessive thermal load. Yet another implementation applies solely compressed air injection for maintaining recirculation of cooling water against natural buoyancy driving forces, if water is the coolant fluid. In this implementation, an air bubble and water mixture in borehole 1 is created to maintain upward flow and the desired circulation direction. The air bubble-water mixture at cooled-down temperature by heat exchanger 23 can still have lower density than the density of the hottest water in fractured zone 6, therefore, it can effectively drive the circulation loop in the desired direction without using pump 12.

A long section along borehole 1 is used for extracting thermal energy from the hot fluid by evaporative heat exchanger 23, as part of a secondary steam cycle that is completed in the power plant with turbines and condensers. A small amount of fluid can be replenished to maintain standing water level 20 if loss occurs from the circulation loop. The hot water is not lifted to the surface in this implementation. An advantage of this implementation is that thermal energy loss can be reduced along borehole 1 from the geothermal energy production level to the power plant level where the thermal-to-mechanical energy conversion takes place. The advantage is seen in transporting thermal energy in latent heat form from a greater depth (at high pressure) to a lower depth (at lower pressure) in gaseous, compressible physical phase. As evaporated steam 25 flows upward from heat exchanger 23 which acts as a boiler, it decompresses and cools, reducing the temperature difference and resulting heat loss between the carrying pipeline and the surrounding rock mass. On the other hand, sufficiently high pressure can be maintained in the steam cycle loop to avoid condensation of the stem as it flows upward in spite of cooling and decompressing.

A two-phase coolant fluid system may also be created in fractured zone 6 by lowering the pressure level by adjusting the pressure at elevation 20. Pressure lowing at elevation 20 may be accomplished, for example, by removing liquid from the borehole 1, or lowering the pressurization of borehole 1 by another pump (not shown) at another elevation or at the surface. The differential pressure in the circulation loop is maintained by pump 12. The absolute pressure in that loop can be independently controlled. For example, a pressure difference 18 can be carried by adjusting the working point of pump 12 (for example, changing its speed); whereas the pressure level at both the intake and delivery points of pump 12 can be simultaneously increased or decreased by adjusting the pressure at elevation 20.

If the pressure at any given location is set lower than the saturated pressure for the coolant fluid at the temperature of the given location, the result will be evaporation. It may be advantageous to induce periodic evaporation by decreasing the pressure level below the saturated pressure limit or dissolution pressure limit for some time in a purging cycle and allowing the gas-phase coolant to repel stagnant liquid-phase coolant packets. During this purging cycle, the coolant circulation is suspended by stopping pump 12 and avoiding gas-phase digestion. Pressure then can be increased above the saturated limit or dissolution limit in another cycle, condensing steam or absorbing the gas-phase component and flooding the fracture system with liquid-phase coolant. The two-phase huff-puff operation may alleviate the loss of active surface area in the heat exchange process between convective coolant fluid and the fractured rock formation. Pressure variations in zone 6 may be accomplished by pumping pressure control from the surface, or pressure control at the subsurface pump, or a combination of the two.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. For example, multiple vertical boreholes with coalesced fractured zones around them can be used to create an even greater rock mass volume with convective heat transfer surface area within it. Boreholes or borehole sections running horizontally and fractured zones created in between can also be used. In this case, extraction of the hot fluid is accomplished at a comparatively low elevation and, therefore, at increased temperature. The fluid extraction system is then typically engineered to maximize the temperature of the hot fluid carrying thermal energy; and minimize the potential heat loss during carrying the hot fluid to the energy conversion implement.

Figure 7:
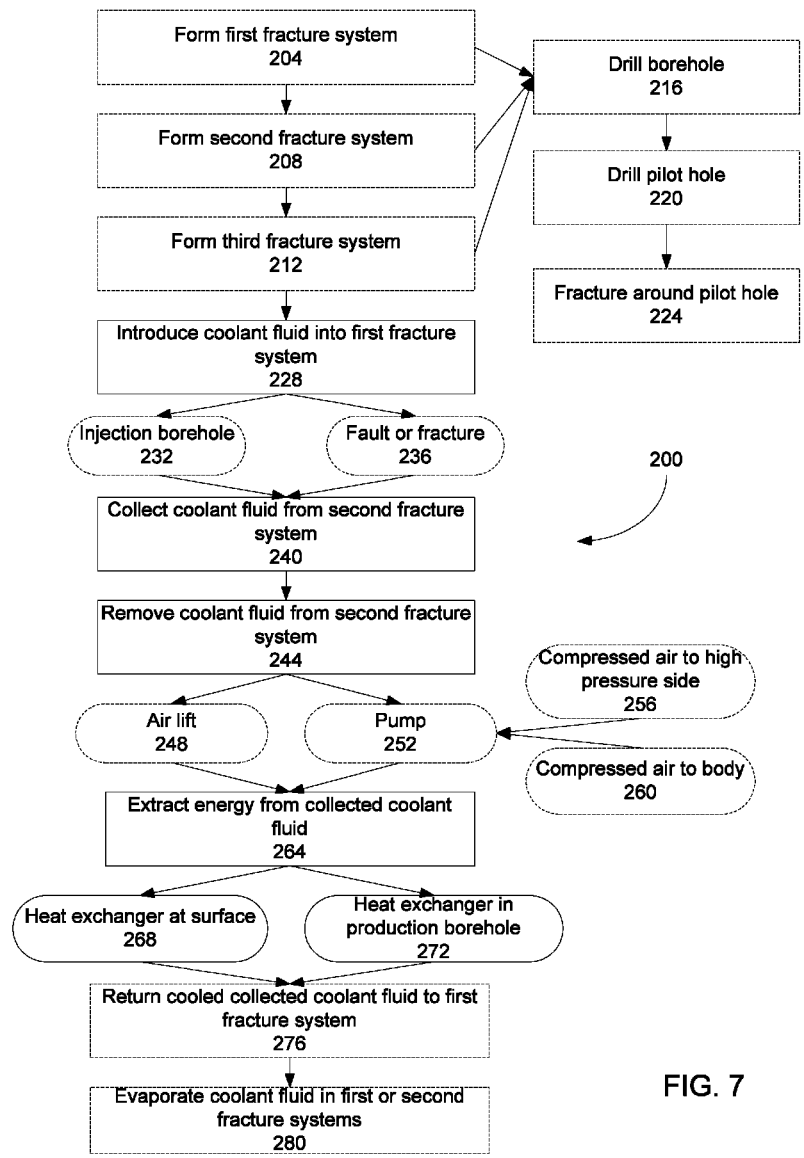
FIG. 7 is a flowchart of a method of extracting geothermal energy according to an embodiment of the present disclosure.

A method 200 of extracting geothermal energy according to an embodiment of the present disclosure is presented in the flowchart of FIG. 7. According to the method 200, first, second, and/or third fracture systems are formed in optional steps 204, 208, 212. According to an implementation of the method 200, steps 204, 208, 212 can involve drilling a borehole in step 216, drilling a pilot hole ahead of the borehole in step 220, and fracturing around the pilot hole in step 224.

Coolant fluid is introduced in the first fracture system in step 228. In one implementation, coolant fluid is introduced into the first fracture system through an injection borehole in step 232. In another implementation, coolant fluid is introduced into the first fracture system through a fault or fracture in step 236, such as from a natural hydrothermal reservoir.

Coolant fluid collects in the second fracture system in step 240, optionally after it has passed through a third fracture system, when present. In step 244, the coolant fluid is removed from the first fracture system. In one implementation, coolant fluid is removed by air lifting in step 248. In another implementation, coolant fluid is removed by a pump in step 252. In a particular example, compressed air is added to the high side of the pump in step 256, which can assist with air lifting. Step 260 shows another example where compressed air is added to the body of the pump, which can aid in cooling the pump during operation.

Energy is extracted from the collected coolant fluid in step 264. In one implementation, step 268, heat is extracted using a heat exchanger located at the surface. In another implementation, step 272, heat is extracted using a heat exchanger located in a production borehole.

In optional step 276, cooled collected coolant fluid is returned to the first fracture system. In another optional step, 280, coolant fluid is cyclically evaporated/liberated and condensed/dissolved in the first, second, and/or third fracture systems, such as by cyclically lowering and increasing the pressure using a pump. Sufficient time periods in the cycle are provided for pursing stagnant cooling fluid from the fractures during evaporation or has liberation in one cycle and delivering coolant fluid during condensation or gas absorption in another cycle.

The embodiments are illustrative, and not intended to limit the scope of the present disclosure. The scope of the present disclosure is rather to be determined by the scope of the claims as issued and equivalents thereto.

I claim:

1. A geothermal energy extraction method comprising, in a geologic formation:
   introducing coolant fluid into a first fracture system at a first height;
   collecting the coolant fluid from a second fracture system at a second height and in fluid communication with the first fracture system to provide collected coolant fluid, the second height being lower than the first heigh,
   wherein the coolant fluid introduced into the first fracture system percolates through a geologic formation from the first fracture system to the second fracture system, collecting heat from the geologic formation; and
   periodically evaporating or liberating fluid and condensing or dissolving fluid within the first or second fracture systems by lowering the fluid pressure of the first or second fracture systems below the saturated pressure of the coolant fluid in one cycle, followed by increasing the fluid pressure of the first or second fractures systems above the saturated or dissolution pressure in another cycle, wherein the evaporation increases the surface area of the first or second fracture systems and condensation replenishes coolant fluid in the first or second fracture systems, thus increasing the surface area for heat exchange in the first or second fracture systems.

2. The geothermal energy extraction method of claim 1, further comprising forming the first fracture system.

3. The geothermal energy extraction method of claim 2, further comprising forming the second fracture system.

4. The geothermal energy extraction method of claim 1, further comprising forming the second fracture system.

5. The geothermal energy extraction method of claim 1, further comprising removing coolant fluid from the second fracture system.

6. The geothermal energy extraction method of claim 1, further comprising extracting energy from the collected coolant fluid.

7. The geothermal energy extraction method of claim 6, wherein extracting energy from the collected coolant fluid comprises contacting the collected coolant fluid with a heat exchanger.

8. The geothermal energy extraction method of claim 1, further comprising:
   extracting heat from the collected coolant fluid to produce cooled collected coolant fluid; and
   wherein the coolant fluid introduced into the first fracture system comprises cooled collected coolant fluid.

9. The geothermal energy extraction method of claim 8, wherein extracting heat from the collected coolant fluid comprises contacting the collected coolant fluid with a heat exchanger.

10. The geothermal energy extraction method of claim 9, wherein the heat exchanger is located within a production well.

11. The geothermal energy extraction method of claim 1, further comprising extracting heat from the collected coolant fluid to produced cooled collected coolant fluid.

12. The geothermal energy extraction method of claim 1, further comprising lowering the pressure proximate the second fracture system to increase coolant fluid flow into the second fracture system.

13. The geothermal energy extraction method of claim 1, wherein the first fracture system has a first temperature and the second fracture system has a second temperature, the second temperature being higher than the first temperature.

14. The geothermal energy extraction method of claim 1, furthering comprising forming the first or second fracture system by drilling a borehole, drilling a pilot hole ahead of the borehole, and causing fracturing proximate pilot hole.

15. The geothermal energy extraction method of claim 1, wherein introducing coolant fluid in the first fracture system comprises providing coolant fluid through an injection borehole and wherein collecting coolant fluid from a second fracture system comprises removing coolant fluid from a production borehole.

16. The geothermal energy extraction method of claim 1, wherein introducing coolant fluid in the first fracture system comprising providing coolant fluid from a natural geologic feature.

17. The geothermal energy extraction method of claim 1, further comprising a third fracture system intermediate and in fluid communication with the first and second fracture systems, wherein the coolant fluid passes from the first fracture system, through the third fracture system, and into the second fracture system.

18. The geothermal energy extraction method of claim 1, wherein collecting coolant fluid from the second fracture system comprises injecting compressed air into a high pressure side of a pump, contributing to air lifting of the collected coolant fluid.

19. The geothermal energy extraction method of claim 1, wherein collecting coolant fluid from the second fracture system comprises applying compressed air to the body of a pump at a higher pressure than needed for air lifting, such that expanding air inside the pump lowers the operating temperature of the pump.

20. The geothermal energy extraction method of claim 1, wherein collecting coolant fluid from the second fracture system comprises pumping the collected coolant fluid using a pump located at elevation above the elevation of the collected coolant fluid, wherein the location of the pump aids in opening fractures.

* * * * *